United States Patent [19]

Marx

[11] 4,372,429

[45] Feb. 8, 1983

[54] PNEUMATIC SPRING WITH PROTECTIVE BOOT

[75] Inventor: Thomas O. Marx, Rockton, Ill.

[73] Assignee: Atwood Vacuum Machine Co., Rockford, Ill.

[21] Appl. No.: 137,747

[22] Filed: Apr. 7, 1980

[51] Int. Cl.³ .............................................. F16F 9/38
[52] U.S. Cl. ........................... 188/322.12; 267/64.15
[58] Field of Search ................... 267/65 R, 120, 121, 267/64.15; 188/321, 322, 322.12; 156/86; 264/230, 342 R

[56] References Cited

U.S. PATENT DOCUMENTS

| 3,499,505 | 3/1970 | DeCarbon | 188/322 |
| 3,948,498 | 4/1976 | Hirano | 267/65 R |
| 4,108,423 | 8/1978 | Skubal | 188/322 |
| 4,245,674 | 1/1981 | Nakamura et al. | 156/86 |
| 4,257,581 | 3/1981 | Keeler | 188/322 |

FOREIGN PATENT DOCUMENTS

| 477885 | 10/1951 | Canada | 188/322 |
| 1902019 | 8/1970 | Fed. Rep. of Germany | 188/322 |
| 2310238 | 10/1973 | Fed. Rep. of Germany | 267/65 R |
| 713188 | 9/1966 | Italy | 188/322 |

*Primary Examiner*—Duane A. Reger

*Attorney, Agent, or Firm*—Leydig, Voit, Osann, Mayer and Holt, Ltd.

[57] ABSTRACT

A gas spring assembly for use in opening and closing a hinged deck lid of an automotive vehicle. The gas spring includes a fluid containing cylinder having a closure at one end and a plunger rod carrying a piston slidably supported in the other end for reciprocating movement between an extended lid opening position and a retracted lid closing position. An elongated hollow boot is secured to and surrounds the portion of the plunger rod extending from the cylinder, as well as a portion of the cylinder, and is movable in unison with the plunger rod for protectively containing the extended plunger rod portion in both extended and retracted positions. When installed on a vehicle body, the gas spring further includes a temporary heat shrink sheath tightly surrounding the boot for insuring a tight seal between the end of the boot and cylinder and for further protecting the gas spring from chemicals or other contaminants to which the vehicle is exposed during metal pretreatment processes following assembly of the gas spring on the vehicle body. The heat shrink sheath is destructible and readily removable from the boot and cylinder upon exposure to relatively high temperatures, such as occurs during bake-oven treatments of a vehicle following such metal pretreatment processes, leaving the boot as a permanent protector of the extendable plunger rod.

6 Claims, 5 Drawing Figures

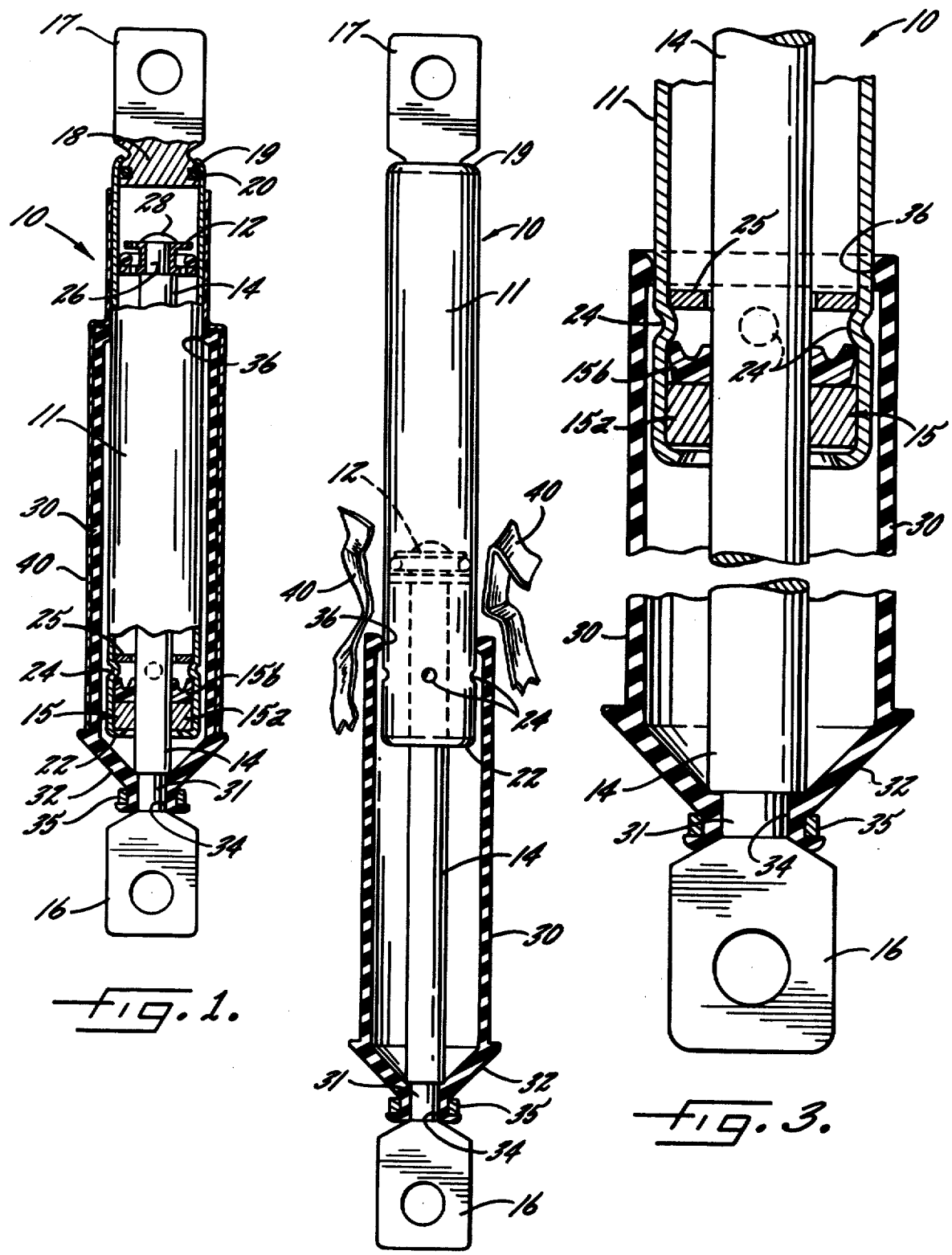

PNEUMATIC SPRING WITH PROTECTIVE BOOT

DESCRIPTION OF THE INVENTION

The present invention relates to gas springs of the type in which a piston assembly carried on the end of a rod slides in reciprocating fashion in a gas filled cylinder as the spring is expanded and contracted.

Gas springs of such type commonly are employed in the automotive industry for controlling the opening and closing of hinged deck lids, such as hoods, hatchbacks and the like, of an automotive vehicle. During assembly of the vehicle, it is desirable to install such gas springs on the vehicle body and deck lid so that it can be utilized for maintaining the lid in an open position when necessary during subsequent steps in the manufacturing process, such as during metal pretreatment cycles prior to priming and painting of the vehicle. However, as the vehicle passes through such metal pretreatment stations, which usually involves complete immersion of the body in chemicals with the deck lid at least partly open, the gas spring, and particularly the exposed portion of the extended plunger rod, is subjected to the chemicals employed in such treatment, often causing a film or other undesirable buildup on the rod which can adversely effect the operation of the spring during subsequent use. The gas springs are exposed to further contaminents during priming and painting processes, and also incur relatively extreme temperatures during bake-oven treatments following each of such process steps. While it has been proposed that dummy or temporary gas springs be used during assembly of the deck lid and then be replaced with production gas springs following painting and bake-oven treatments, such procedure would require the use of additional gas springs, plus added assembly and disassembly steps, increasing the cost of production.

It is an object of the present invention to provide a gas spring which may be permanently installed in a vehicle during assembly of a hinged deck lid and be utilized as the vehicle is processed through the body pretreatment and paint cycles, without contaminating the working parts of the gas spring or adversely effecting its subsequent operation.

Another object is to provide a gas spring as characterized above in which the retractable and extendable plunger rod thereof is protected from chemicals and other contaminants to which the vehicle is exposed during such metal pretreatment processes even though the rod is in its extended lid opening position.

A further object is to provide a gas spring of the above kind which includes temporary means for protecting the gas spring assembly from contaminants during processing of a vehicle through metal pretreatment processes, as well as means for permanently protecting the plunger rod thereof from contaminants during subsequent normal use of the gas spring.

Yet another object is to provide a gas spring of the foregoing type in which the temporary protective means is automatically removable from the gas spring assembly upon being subjected to relatively high temperatures, such as occurs when the vehicle passes through a bake-oven cycle upon completion of the metal pretreatment process.

Other objects and advantages of the invention will become apparent upon reading the following detailed description and upon reference to the drawings in which:

FIG. 1 is a longitudinal sectional view of a gas spring embodying the present invention, shown in the condition in which it is installed in an automotive vehicle with the plunger rod in this case being in a retracted lid closing position;

FIG. 2 is a longitudinal section of the gas spring shown in FIG. 1 with the plunger thereof in an extended position and with an outer temporary protective layer breaking away, such as occurs during a bake-oven treatment of a vehicle on which it is mounted;

FIG. 3 is an enlarged fragmentary section of the air spring shown in FIG. 2.

Figure 4:
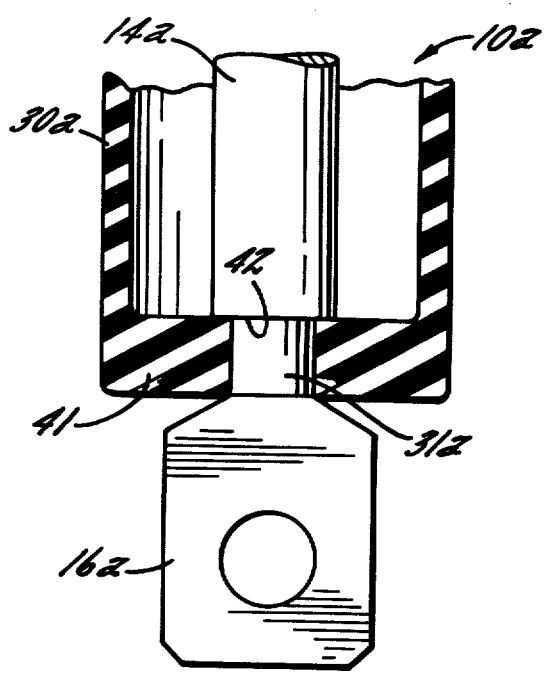
FIGS. 4 and 5 are fragmentary sections of an air spring having an alternative form of permanent protective boot.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

Referring now more particularly to the drawings, there is shown an illustrative gas spring 10 embodying the invention which may be utilized for lifting and holding a movable member, such as a hinged vehicle deck lid (not shown), in a predetermined opened position. The spring 10 includes an elongated cylinder 11 enclosed at its upper end (as viewed in the drawings) and a piston assembly 12 carried on the end of a plunger rod 14 which is slidably supported in the other end of the cylinder by a seal assembly 15. Although the spring 10 may be inverted, typically when used with a vehicle deck lid the outwardly projecting end of the plunger 14 is pivotably connected to the lid, such as by an apertured flange 16 formed or carried at the end of the rod, and the cylinder 11 is pivotably connected to the vehicle body, such as by an apertured flange 17 at closed end of the cylinder.

In the present instance, the upper end of the cylinder is closed by a cylindrical plug 18 which is integrally formed with the apertured mounting flange 17. The plug 18 is received within the end of the cylinder with a force fit and is held in place by an inturned flange 19 of the cylinder. For providing a seal between the plug 18 and cylinder wall, an "O" ring 20 is received with an annular groove formed about the outer periphery of the plug.

The seal assembly 15 at the opposite end of the cylinder includes an annular housing member 15a and a flexible sealing member 15b immediately adjacent the housing member. The housing and sealing members 15a, 15b are interposed between an inturned flange 22 formed on the lower end of the cylinder and a plurality of circumferentially spaced dimples 24 crimped into the cylinder. In this instance, a rigid metal washer 25 is disposed within the cylinder on the opposite side of the dimples 24. As is customary in gas springs, the cylinder is filled with a pressurized fluid which typically is a combination of oil and inert gas, such as nitrogen, under pressure.

The piston assembly 12 is seated on a reduced diameter end portion 26 of the plunger rod 14 and is maintained in place by a head 28 upset on the rod end. The piston assembly may be of a conventional type, such as shown in Skubal, U.S. Pat. No. 4,108,423. In such a piston design, as the gas spring is expanded through outward extension of the plunger rod 14 to the position shown in FIG. 2, such as occurs when opening a deck lid to which it is secured, the piston 12 causes a restricted flow of fluid within the cylinder, resulting in a dampening effect. When the plunger rod 14 is moved in an opposite direction to the retracted position in the cylinder shown in FIG. 1, such as when the deck lid is closed, the piston 12 permits the gas and oil to flow comparatively freely so there is virtually no dampening action as the spring is contracted.

In accordance with the invention, the gas spring includes means secured to and surrounding the end of the plunger extending from the cylinder for reciprocating movement in unison with the plunger rod such that the extended portion of the rod is at all times protectively contained. To this end, in the illustrated embodiment, an elongated generally cylindrical shaped boot 30 is provided which encompasses the end of the plunger rod 14 and a portion of the cylinder 11. The boot 30 has one end securely attached to the outermost end of the plunger rod, a body portion extending in parallel spaced relation to the plunger rod and the outer surface of the cylinder received therein, and its opposite end in sliding engagement with the outer surface of the cylinder. The boot preferably is made of a rubber-like elastomeric material, and has a hardness so that the boot has sufficient rigidity to maintain its shape and spacing about the rod while being adequately flexible to permit the ends of the boot to be stretched into relatively tight fitting relation over the cylinder and plunger rod during assembly of the boot.

To facilitate secure attachment of the boot 30 to the end of the plunger rod 14, the plunger rod is formed with a reduced diameter neck portion 31 near its outermost end and the boot is formed with a conically shaped end 32 which terminates in a cylindrical neck portion 34 of slightly lesser diameter than the neck 31 of the rod. A plastic tie 35 in this case is tied about the periphery of the cylinder neck portion 34 of the boot to insure a tight seal.

For providing a sliding engagement between the opposite end of the boot 30 and the outer periphery of the cylinder 11, the end of the boot is formed with an inwardly directed annular bead 36 which defines an opening having a diameter slightly less than the outer diameter of the cylinder such that the end of the boot may be stretched over the cylinder and will remain in relatively tight contact with the cylinder surface. It will be seen that with the boot 30 mounted about and secured to the plunger rod 14 in such manner, the boot will move in unison with the extendable and retractable movement of the plunger rod with the bead end of the boot in sliding contact with the cylinder. The boot 30 preferably should be of a length such that the annular bead 36 will be maintained in complete uninterrupted engagement with the surface of the cylinder throughout the limits of rod extension and retraction. In the illustrated embodiment, it can been seen that the boot 30 is of such length that when the rod 14 is in its fully extended position, shown in FIG. 2, the bead 36 of the boot remains on a cylindrical portion of the cylinder short of the dimples 24, and when the rod 14 is in its fully retracted position, shown in FIG. 1, the bead 36 of the boot remains on the cylindrical portion of the cylinder short of the closed end.

In carrying out another aspect of the invention, a temporary protective sheath 40 is applied about the boot 30 and cylinder 11 for insuring a tight seal between the bead 36 and cylinder and for further protecting the gas cylinder from chemicals into which the vehicle body is immersed or otherwise subjected to during metal pretreatment processing of the vehicle body following installation of the gas cylinder. The temporary sheath 40, however, is destructible and automatically removable from the cylinder and boot upon exposure to relatively high temperatures, such as are experienced during the bake-oven treatment of the vehicle body following such metal pretreatment steps.

In the illustrated embodiment, as shown in FIG. 1, the sheath 40 is a thin walled heat shrinkable PVC tubing which encompasses the outer cylindrical portion of the boot 30 and the remaining portion of the cylinder 11 not contained within the boot when the rod is in its retracted position. The PVC tubing 40 may be of a commercially available type, and as will be understood by one skilled in the art, may be positioned loosely over the cylinder and boot and by the application of heat, such as to about 200° F., shrunk into tight fitting relation about the outer surfaces of the boot and cylinder.

The gas spring 10 with such a temporary protective sheath 40 and permanent boot 30 may be installed on a vehicle body with a hinged deck lid in a manufacturing line. Upon extension of the plunger rod, either for purposes of assembly on the vehicle, or upon opening of the deck lid upon which it is installed following assembly, the boot 30 will be moved in unison with the plunger rod 14. In addition, because the heat shrink sheath 40 primarily encompasses the boot, the sheath also will move with the boot 30 and rod 14 with the portion of the sheath 40 directly overlying the cylinder sliding along the cylinder while remaining in relatively tight fitting relation about the cylinder. As a result, when the gas spring 10 is utilized to hold a deck lid in an open position following its assembly on the vehicle, such as during immersion of the vehicle in a metal pretreatment dip prior to priming and painting of the vehicle, the boot 30 and heat shrink sheath 40 serve to effectively seal and protect the outwardly extended portion of the plunger rod 14, as well as the portion of the cylinder 11 contained within the boot. Moreover, upon closure of the deck lid following the metal pretreatment dip, such as may occur prior to bake-oven treatment of the vehicle, the chemicals remaining on the portion of the cylinder 11 which is not within the boot 30 and sheath 40 will be wiped from the cylinder first by the sliding movement of the sheath and then by the sealing bead 36 of the boot, as they are moved with the plunger rod 14 toward their retracted positions overlying the cylinder.

In the usual processing of automotive vehicles, following the metal pretreatment dip or immersion step and prior to priming and painting, the vehicle is transferred to a bake-oven where it is exposed to relatively high temperatures, such as in the range of 350°–450° F. At such temperatures the relatively thin walled heat shrink sheath 40 will become brittle, crack, and ultimately fall from the cylinder, either upon exposure to such temperatures for a prolonged period or upon extension or retraction of the plunger rod following the application of such temperatures, as shown in FIG. 2. In either case, the sheath will soon become removed from the cylinder leaving the boot, which is uneffected by the bake-oven treatment, permanently encasing and shielding the extendable and retractable plunger rod during priming, painting, and completion of the manufacture of the vehicle, as well as during subsequent normal use of the gas cylinder on the vehicle.

Figure 5:
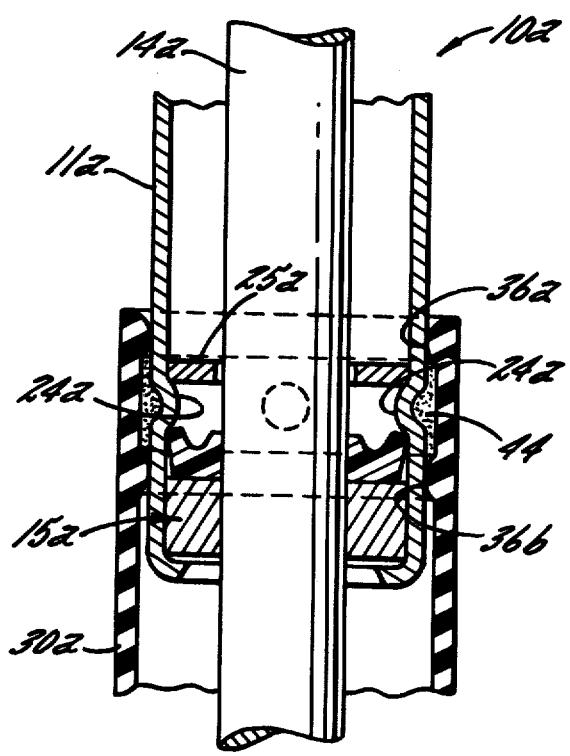

Referring now to FIGS. 4 and 5 there is shown in a gas cylinder 10a similar to that previously described but with an alternative form of protective boot, wherein elements similar to those previously described have been given similar reference numerals with the distinguishing suffix "a" added. The boot 30a in this case has a relatively heavy walled neck or end 41 formed with an aperture for tightly receiving the reduced neck 31a of the plunger rod end. The thickness of the boot end 41 also preferably is slightly greater than the length of the reduced diameter portion 31a of the rod such that the end of the boot may be forced into tight sealing engagement against an annular shoulder 42 of the rod formed by the neck 31a.

For providing a sliding seal between the opposite end of the boot 30a and cylinder 11a, the boot in this case is formed with a pair of longitudinally spaced inwardly directed sealing beads 36a and 36b between which is contained a quantity of oil or other lubricant 44. The use of such a plurality of beads 36a, 36b, particularly in conjunction with a lubricant that maintains a wet film between the beads and cylinder, enhances the sliding seal between the end of the boot and cylinder. As shown in FIG. 5, with such arrangement the inner sealing bead 36b may be moved beyond the seal retaining dimples 24a in the outer periphery of the cylinder during extension of the plunger rod, if necessary, without jeopardizing the seal. It will be appreciated that an outer heat shrink sheath, such as previously described, may be similarly used about the boot 30a.

From the foregoing, it can be seen that the gas spring of the present invention may be permanently installed in a vehicle during assembly of a hinged deck lid and be utilized for holding the deck lid in an open position as the vehicle is processed through subsequent body treatment and paint cycles without contaminating the working parts of the gas spring or otherwise adversely effecting its subsequent use. Moreover, the gas spring not only includes temporary means for protecting the gas spring assembly from contaminants during such processing of the vehicle upon which it is assembled, it also includes means for permanently protecting the exposed portion of the extendable plunger rod during normal use of the spring. Furthermore, it is apparent that the gas spring is of relatively simple and economical construction, and lends itself to efficient use in the assembly of a vehicle upon with which it is used, with the temporary protective means being automatically removable during normal processing of the vehicle.

I claim as my invention as follows:

1. A gas spring assembly for initial use in adverse environmental conditions and subsequent use in less adverse environmental conditions comprising a fluid containing cylinder having a closure at one end thereof, a plunger rod slidably supported in the other end of said cylinder and having a piston at the end thereof within said cylinder, said piston and plunger rod being movable relative to said cylinder from a retracted position in which said rod is received within said cylinder a maximum amount to an extended position in which said plunger rod extends outwardly of said cylinder a maximum amount, an elongated boot made of elastomeric material secured to and surrounding the portion of said plunger rod extending outwardly from said cylinder and being movable in unison with said plunger rod for protectively containing the extended plunger portion in both extended and retracted positions, said boot having one end in sliding engagement with the outer surface of said cylinder, a temporary relatively thin walled protective sheath tightly surrounding said boot and a portion of said cylinder, said sheath being movable with said boot and rod relative to said cylinder while firmly holding said one boot end in relatively tight sliding contact with said cylinder thereby effectively preventing contaminants from passing between said sliding boot end and said cylinder during initial use of said assembly, and said temporary sheath being made of a frangible material which is destructible and readily removable from said boot upon exposure to a predetermined temperature which is unharmful to the material of said boot thereby leaving said boot as a permanent protector of the extendible plunger rod during subsequent use of said assembly.

2. The gas spring assembly of claim 1 in which said boot has an elongated hollow body supported in spaced relation to said extended plunger rod portion and the portion of said cylinder received therein.

3. The gas spring assembly of claim 1 in which said other boot end is formed with an inwardly directed annular bead that is in slidable bearing engagement with the outer surface of said cylinder.

4. The gas spring assembly of claim 3 in which the annular bead of said boot defines an annular opening of a diameter less than the outer diameter of said cylinder.

5. The gas spring assembly of claim 4 in which said boot is formed with a neck portion having an internal opening of a diameter less than the diameter of the plunger rod end to which it is secured.

6. The gas spring assembly of claim 1 in which said other boot end is formed with a plurality of longitudinally spaced inwardly directed annular beads that are in slidable bearing engagement with the outer surface of said cylinder, and a lubricant is confined in a space between said beads and said cylinder for enhancing a slidable seal therebetween.

* * * * *